Sept. 5, 1933. H. W. COOPER 1,925,137
MANUFACTURE OF INSULATING MATERIAL
Filed Nov. 3, 1927 7 Sheets-Sheet 4

Inventor
Henry W. Cooper
by Warren G. Ogden
his Atty.

Sept. 5, 1933.  H. W. COOPER  1,925,137
MANUFACTURE OF INSULATING MATERIAL
Filed Nov. 3, 1927  7 Sheets-Sheet 5

Inventor
Henry W. Cooper
by Warren G. Ogden
his Atty

Sept. 5, 1933.   H. W. COOPER   1,925,137
MANUFACTURE OF INSULATING MATERIAL
Filed Nov. 3, 1927   7 Sheets-Sheet 7

Inventor
Henry W. Cooper
by Warren G. Ogden
his Atty.

Patented Sept. 5, 1933

1,925,137

UNITED STATES PATENT OFFICE 1,925,137

MANUFACTURE OF INSULATING MATERIAL

Henry W. Cooper, West Newton, Mass., assignor to New England Mica Co., Waltham, Mass., a corporation of Massachusetts Application November 3, 1927. Serial No. 230,891

23 Claims. (Cl. 154—2.5)

This invention relates to an improvement in the manufacture of insulating material and to the method and apparatus by which said material is made.

The invention is herein described as employed in making insulating material comprising layers of mica flakes joined by a suitable binder, but it will be understood that this description is merely illustrative and not limitative and that it is within the scope of the invention to employ other material.

The primary object of this invention is to facilitate the forming of the insulating material as a continuous sheet, the inspecting of the material as soon as it is formed and the cutting of sheets of convenient size from the sheet, the inspecting and cutting preferably taking place while the sheet is in motion.

Another object of this invention is to form a continuous sheet of insulating material upon a continuously moving conveyer of foraminous material said sheet being inspected and rectified while on the conveyor to insure an even product.

A further object of this invention is to provide means for eliminating from the bottom layer of the material any particles of less than a predetermined size.

Other objects will appear from a consideration of the following description taken in connection with the drawings which form a part thereof and in which:

Figures 1 and 1a, when the former is placed at the right of the latter, represent a side elevation of one form of apparatus that might be used to carry out this invention;

Fig. 15 is a view, in front elevation, of the clutch of the cutting mechanism.

In the embodiment of the invention shown in the drawings, the apparatus is preferably situated upon two floors of a mill or two platforms, one above the other, the lower being designated generally, in the drawings, by A and the upper by B. Mounted upon the lower floor A is the main portion of the apparatus which comprises a frame 20 (Figs. 1 and 1a) having a pair of horizontal side bars 21 (Fig. 8) supported upon a plurality of posts 22. As shown in the sectional views of the drawings both the side bars 21 and the posts 22 may conveniently be angle irons. The posts 22 are connected by cross-bars 23, upon which is supported, at about the middle of the apparatus, a table 24 which consists of planks 25 (Figs. 2 and 3) and covering or finishing strips 26 resting upon the planks.

Figure 9:
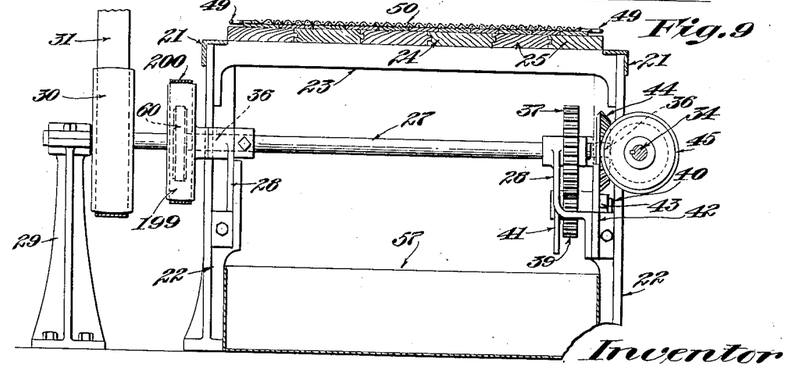
Fig. 9 is a view, in cross-section, taken on the line 9—9 of Fig. 5.

Carried by the frame 20 at its forward end (at the left of Fig. 1a) is a shaft 27, (Fig. 9) hereinafter referred to as the main drive-shaft, mounted upon brackets 28 supported upon a cross-bar carried by the two forward posts 22. A pedestal 29 at the side of the frame work 20 forms a further support for one end of the shaft 27. A main drive pulley 30 fixed on the shaft, preferably adjacent the pedestal 29, is driven by a belt 31 driven from a suitable source of power (not shown).

Mounted in the frame 20 at suitable intervals along its length are a plurality of cross shafts 32 (Fig. 8) each shaft having at one end a gear 33. The gear 33 on each shaft 32 is preferably located at the right side of the frame 20 i. e. the side exposed in Figs. 1 and 1a. A shaft 34 extends the length of the frame 20 along the right side thereof being supported by a plurality of bearing plates 35 carried by the posts 22.

The shaft 34 is driven from the main shaft 27 by the following mechanism. Suitably supported upon the frame 20 adjacent the shaft 27 and parallel thereto is a stub shaft 36 (Figs. 5 and 9) which is driven from the shaft 27 by means of a pair of gears 37, 38 mounted upon the shafts 27 and 36. The gears are caused to rotate in the same direction by means of an intermediate gear 39 mounted upon a pin 40 carried by an arm 41 pivotally supported upon the shaft 36, the pin 40 extending through an arcuate slot in a plate 42 supported from the frame. Thus a gear 37 may be mounted on the shaft 27 of the required diameter and number of teeth to control the speed of rotation of the shaft 36 as may be desired. The intermediate gear 39 is at all times in mesh with the gear 38 and by virtue of the construction previously described can, by means of the arm 41, be swung into mesh with the gear 37 regardless of the size of said gear 37. The gear 39 is held in place by means of a nut 43 on the pin 40 which, when tightened, insures the position of the pin 40 in the slot of the plate 42.

On the shaft 36 is mounted a beveled gear 44 (Figs. 5 and 9) which engages with a beveled gear 45 on the shaft 34. The shaft 34 is thus driven through the stub shaft 36 from the main shaft 27. The longitudinal shaft 34 carries a plurality of worms 46 (Figs. 1, 1a, 2 and 5) certain of which engage the gears 33 on the various cross-shafts 32.

On each shaft 32 between and adjacent the side bars 21 are mounted sprockets 47 (Fig. 8) over which pass a conveyer 48. The conveyer 48 comprises side chains 49 which engage the sprockets 47 and a foraminous body 50, preferably a wire mesh cloth having about four meshes to the inch, to the side edges of which the chains 49 are secured in any suitable manner. The conveyer 48 during its functioning or advance travel is supported by the sprockets 47, while on its idle or return travel it is supported by a plurality of rollers 51 (Figs. 2 and 8) on which the chains 49 rest. The rollers 51 extend between and are carried by pairs of posts 22 being free to rotate as the conveyor passes thereover. Idle sprockets 52 (Figs. 3 and 5) mounted on cross shafts 52a in brackets 53 on the posts 22 at the forward end of the frame engage and are driven by the chain 49. In order to insure the engagement of the conveyor chains 49 with the sprockets 47 at the forward end of the frame, sprocket wheels 54 (Fig. 3) are provided, which are mounted upon brackets 55 extending upwardly from the side bars 21 adjacent the sprockets 47 and which press upon the chains 49 to hold them in mesh with the teeth of the sprockets 47.

Figure 2:
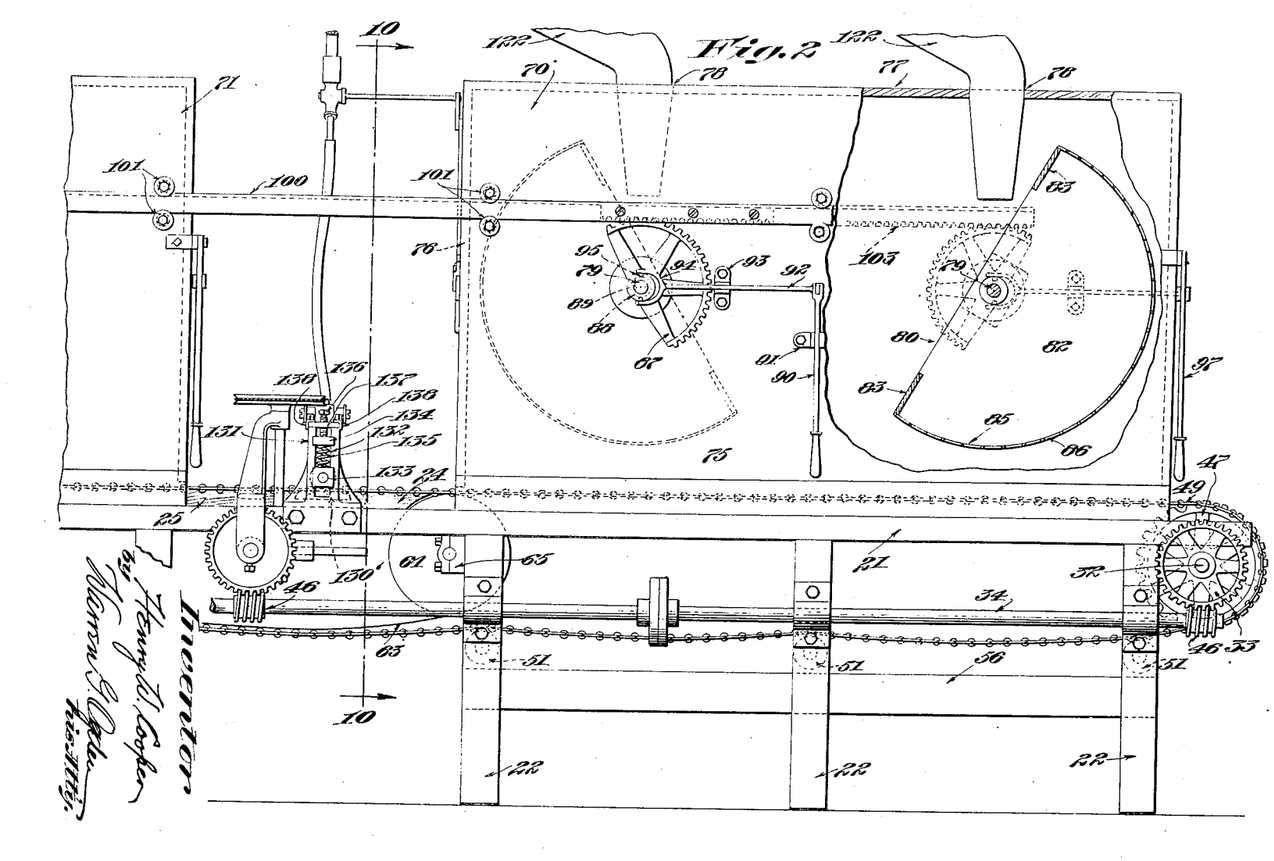
Fig. 2 is a view, in enlarged elevation and partly in section, illustrating the first period of the sheet forming stage of the operation wherein the lower layer of mica flakes is layed.

The conveyor 48 extends at its rear end beyond the table 24, as shown in Fig. 2, and under that extended portion of the conveyor is mounted a receptacle 56, for a purpose set forth hereinafter, suitably supported by the posts 22.

Figure 3:
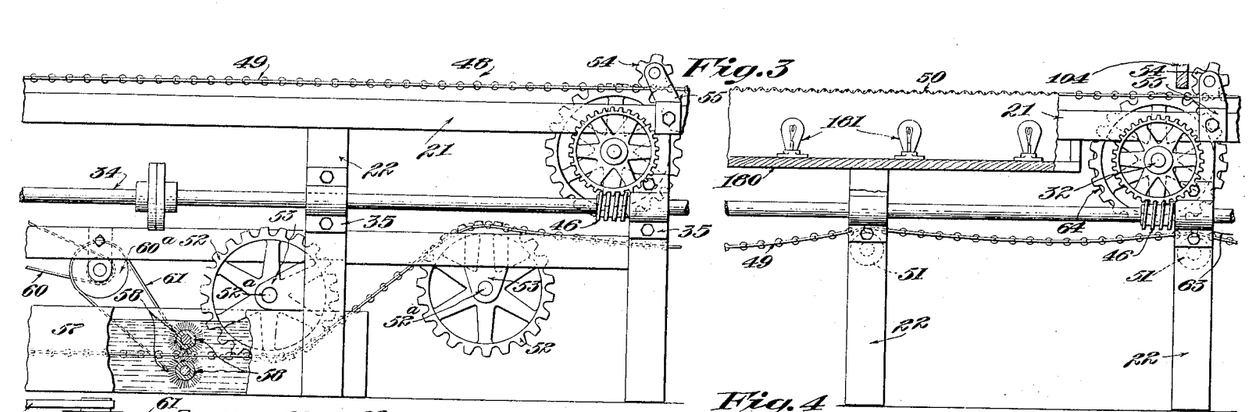
Fig. 3 is a view, in enlarged side elevation and partly in section, illustrating the inspection stage of the operation and also a part of the apparatus by which the conveyor is cleaned.
Figure 4:
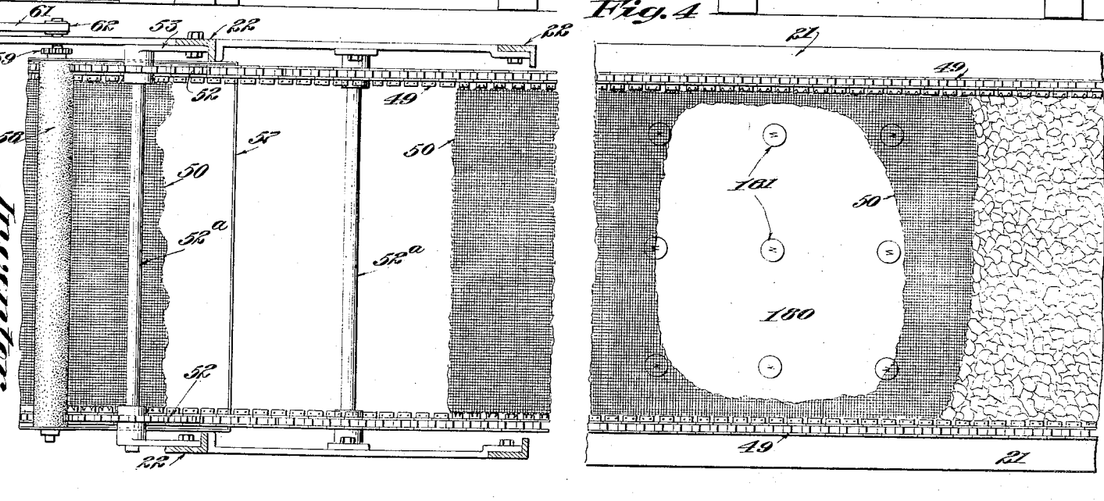
Fig. 4 is a plan view, partly in section, of portions of the apparatus shown in Fig. 3.
Figure 5:
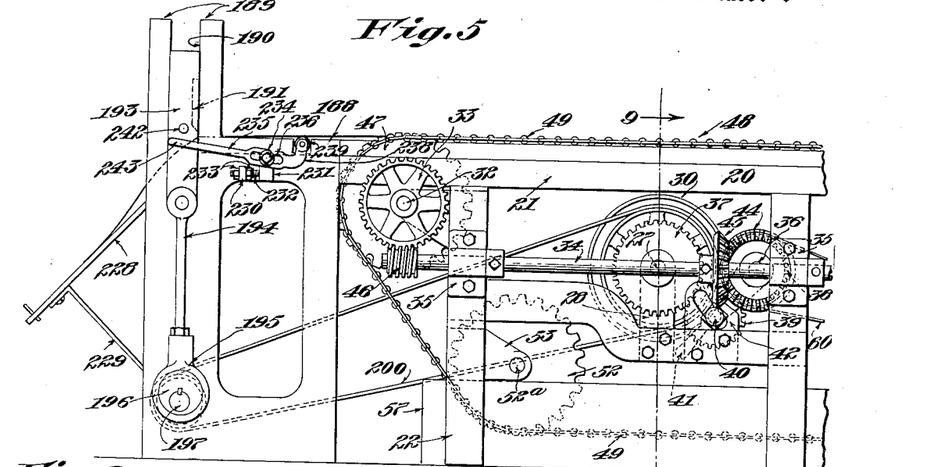
Fig. 5 is a view, in side elevation, of the forward end of the apparatus illustrating the final or cutting stage of the operation.

Below the forward end of the conveyor is mounted a tank 57 (Fig. 3) which contains soda or other cleaning fluid and through which the conveyor passes on its return travel. The conveyor 48 is guided through the cleaning tank 57 by pairs of the idle sprockets 52 located at each end of the tank 57 (Figs. 3 and 5). Mounted in the tank 57 near its inner end are a pair of opposed roller wire brushes 58, each of said brushes having at one end a gear 59 (Fig. 4), which gears inter-mesh so that the brushes will rotate in opposite directions. The brushes 58 are driven from the stub shaft 36 by means of a belt 60 which rotates an intermediate pulley 60a, driving a belt 61 connecting the pulley 60a to a pulley 62 on the shaft of one of the roller brushes 58 (Figs. 3 and 4).

The table 24 is covered by an endless belt 63 (Figs. 1, 1a and 2) preferably of close woven fabric or other impervious material, carried by freely moving rollers 64 mounted at the rear end of the table 24 and to the rear of the inspection table hereinafter to be referred to. The roller 64 at the rear end of the table 24 (Fig. 2) is carried by blocks 65 supported from the posts 22 adjacent that end of the table, while the forward roller 64 (shown in Figs. 1a and 3) is carried by the shaft 32 at that portion of the table 24 but is free to rotate relative to said shaft. Since both the rollers for the belt are idle, the belt is driven only by its contact with the conveyor 48 as it passes over the table. The belt thus eliminates any friction upon the conveyor 48 as it passes over the table and also protects the table from and removes any flakes that may fall through the meshes of the conveyor body.

In carrying out this invention, the insulating material is built up upon the conveyor 48 as a sheet composed of a plurality of layers joined by a suitable binder, each layer being supplied from one of a series of suitable bins located above the conveyor. The apparatus upon which the present drawings are based is provided with five such bins, designated on Fig. 1 as 70, 71, 72, 73 and 74.

Alternating with the bins are four devices for applying the binder, and a like device is located forward of the last bin. The formation of the material is referred to herein as the first stage of the operation. Since the plate of insulating material made by the illustrated apparatus may comprise five layers of mica flakes, the first stage of the operation may be divided into five periods, each period consisting of the formation of one layer and the application of a binder thereto.

Figure 8:
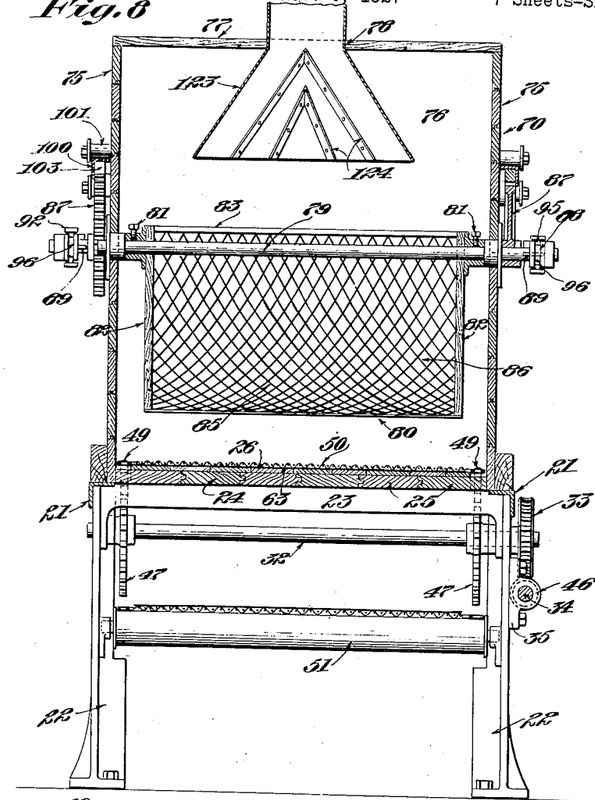
Fig. 8 is a view, in enlarged cross-section, taken on the line 8—8 of Fig. 1.

Each of these bins is the same in structure and operation and consequently one, the first bin 70, will be described in detail, reference be made to Figs. 2 and 8 in which certain parts are broken away in order to disclose the mechanism within each bin. Each bin is open at the bottom and comprises side walls 75, supported by the side bars 21, end walls 76 and a top wall 77 which is closed except for the provision of holes 78 for the purpose to be hereinafter explained. Supported in the side walls 75 are a pair of parallel shafts 79 on which shafts are hung cradles 80. Each cradle 80 is fixed to turn with its shaft 79 by any suitable means such as set screws 81.

Each cradle has a pair of semi-circular end walls 82 connected by cross plates 83 at the diameter end thereof. The cross plates 83 are parallel and define with the walls 82 the mount of the cradle. The circular wall forming the bottom of the cradle 80 is of foraminous material, preferably of expanded metal, which acts as a sieve 85, having diamond-shaped openings 86 therein.

The openings 86 in the cradles of the first and last bins which supply the mica for the bottom and top layers are larger than those in the cradles of the intermediate bins. It has been found desirable commercially to have the openings in the cradles of the first and last bins approximately two inches by four inches and the openings in the other cradles approximately one inch by one inch. The cradles as shown particularly in Fig. 8 are removably secured to the shafts 79. Thus the bins can be provided with cradles having openings of a size suitable for the work in hand and, when desired, cradles having any different size of opening may be substituted.

On one end of each shaft 79 and outside one of the side walls 75 is a toothed segment 87 which normally turns freely on the shaft but which, when desired, may be connected to the shaft by means of a clutch sleeve 88, held by a key 89 against rotative movement relative to the shaft 79, but free to reciprocate longitudinally thereof. It will be noted that, in each bin, one of the two cradle shafts 79 extends beyond the right side wall while the other shaft extends beyond the left side wall. The clutch sleeve 88 on the shaft which extends beyond the right side wall, as shown in Figs. 2 and 8, is actuated by means of a lever 90 pivotally supported by a bracket 91 on the wall 75. The lever 90 is pivotally joined at its upper end to a horizontal arm 92 in turn pivotally supported on the side wall 75 in a bracket 93. A yoke 94 at the outer end of the horizontal arm 92 embraces the sleeve 88 and carries pins 95 which enter an annular track 96 in the sleeve.

It is desired that this machine be operated solely from the right side and, accordingly, the arms 92 which control the clutch sleeves 88 on the shafts 79 projecting beyond the left side walls 75, are actuated by levers 97 at the rear end of each bin. Each lever 97 (Figs. 2 and 10) is pivoted at its upper end on a bracket 98 offset from the right side wall 75 of the bin and is connected to its clutch arm 92 by means of a rod 99 which extends across the rear end wall. The rod 99 is pivotally connected at one end to the lever 97 and at its other end to the arm 92.

Thus the levers 97, brackets 98 and rods 99 are employed to throw the clutch sleeves at the left of the bins and the levers 90 are employed to throw the clutch sleeves at the right thereof. By reason of the fact that the fulcrum of each lever 97 is above its connection with its arm 92, while the fulcrum of each lever 90 is below its connection with its arm 92, each clutch will be connected by an inward movement of its lever.

The shafts 79 are oscillated by the segments 87 when the clutches 88 are made fast to the shafts. The segments 87 are oscillated by means of a pair of reciprocatory angle-irons 100 which extend at each side of each bin. It will be noted that in the drawings (Figs. 8 and 10) the angle-iron 100 at the right side of the bins operates the front shaft of each bin while the angle iron 100 at the left side of the machine operates the rear shaft thereof. The actuating bars 100 are supported from the bins by means of pairs of anti-friction rollers 101 (see Fig. 2), each roller having a flange 102 which prevents the bar from shifting longitudinally thereof. Fixed in the angle of each bar 100 is a toothed rack 103.

Figures 1, 16:
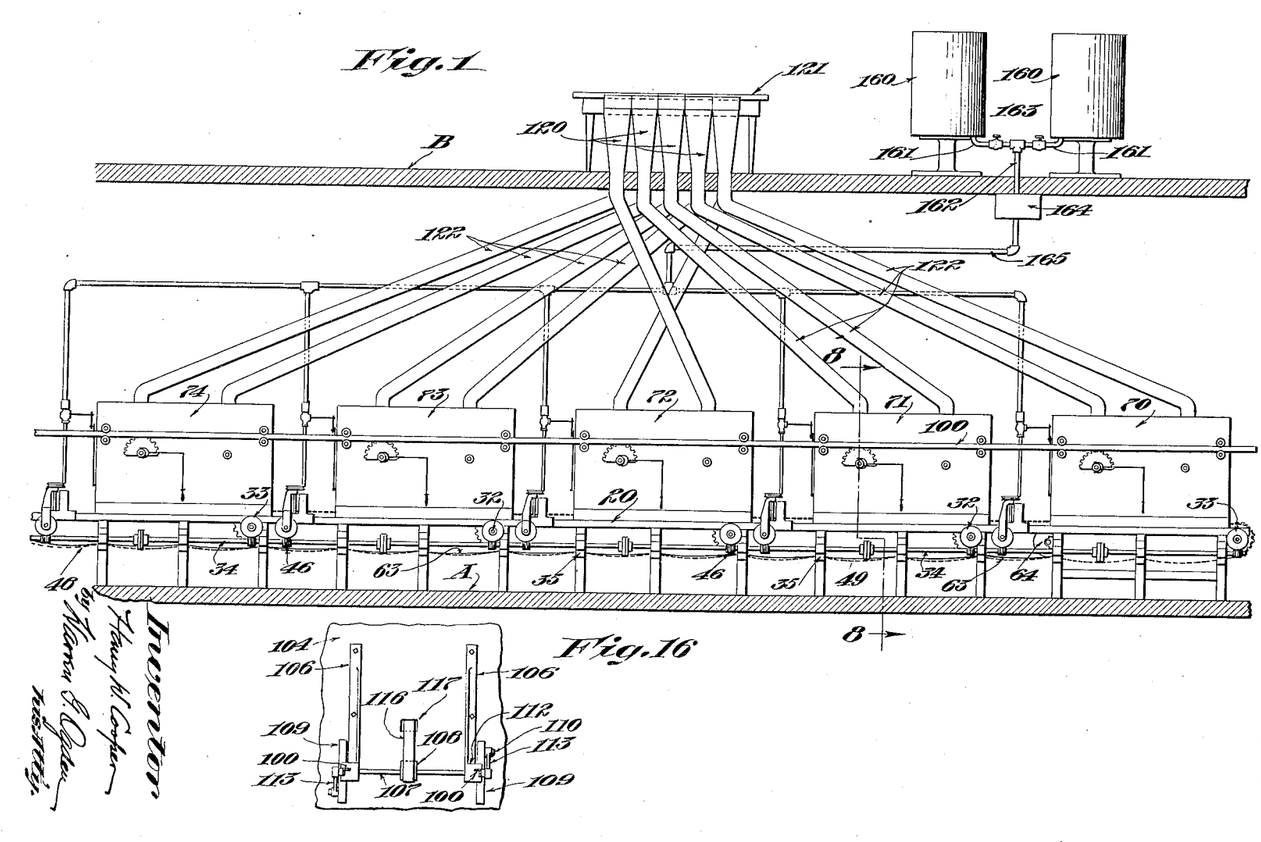
Figures 12, 13, 14, 16:
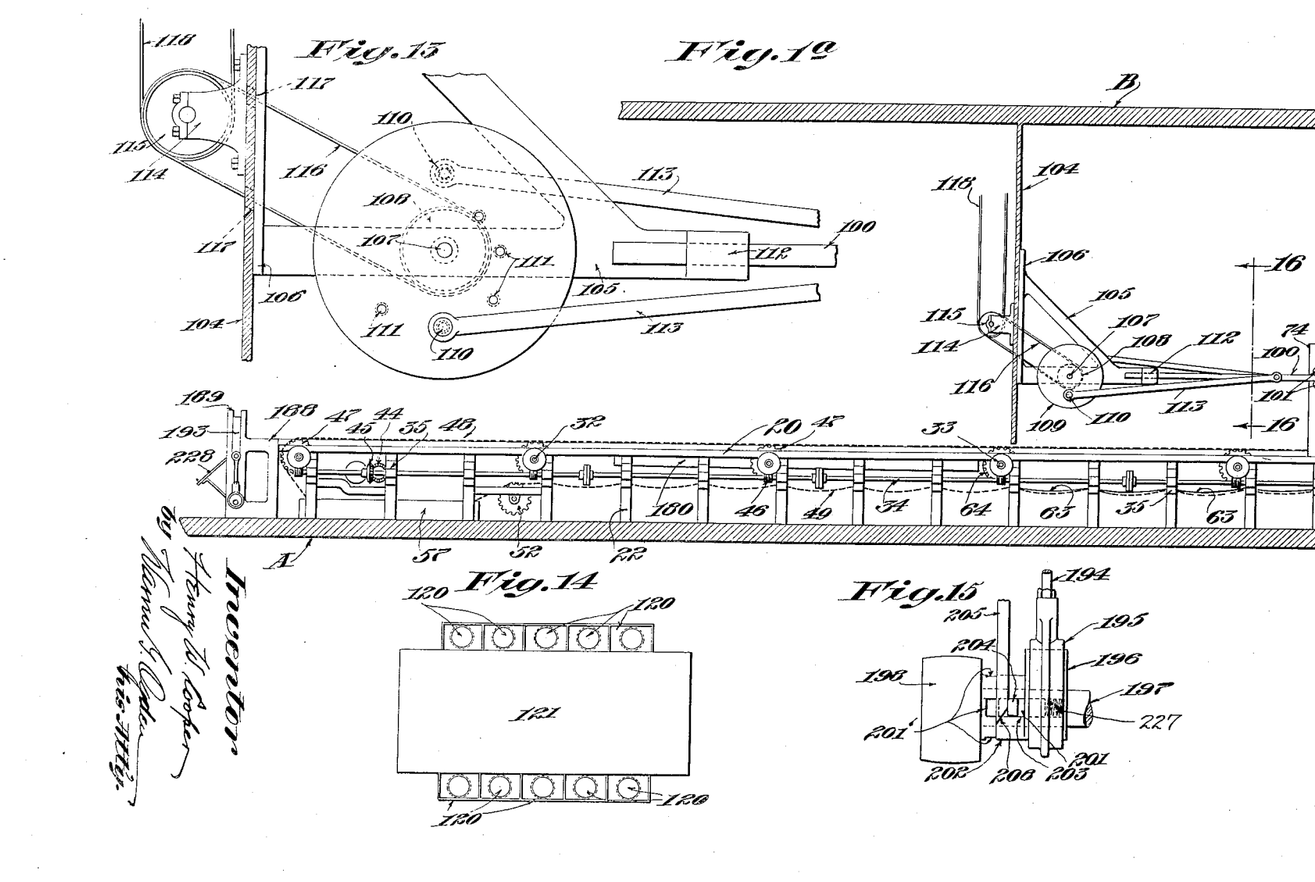
Fig. 12 is a view, in cross-section, taken on the line 12—12 of Fig. 11.
Fig. 13 is a view, in enlarged side elevation, of the mechanism by which the sifting mechanism is operated.
Fig. 14 is a plan view of the table and hoppers through which the mica flakes to be formed into layers are fed into the distributors of the machine.
Fig. 16 is a view, in elevation, of a detail of the operating mechanism.
Figure 12:
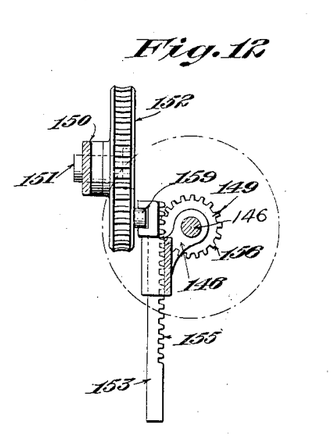

It will be noted from an examination of Figs. 1 and 1a that the bins just described are all located at one side of a vertical partition 104, here shown as supported from the upper floor B, which separates the first or web forming stage of operation from the later stages and to hide the mechanisms just described from the operator at the left of said partitions. Mounted upon the rear side of the partition 104 (Figs. 13 and 17) are a pair of triangular brackets 105, each bracket having a flange 106 at right angles thereto by which flanges the brackets are secured to the partition. Rotatively carried by the brackets 105 is a shaft 107 centrally of which is secured a pulley 108 and a pair of disks 109 on the ends outside said brackets. A wrist pin 110 is fixed on the outer face of each disk and may be placed in any one of a plurality of holes 111 arranged at different radial distances from the shaft 107, as best shown in Fig. 13. The forward end of each actuator bar 100 extends through a guide sleeve 112 on one side of the brackets 105 and is connected by a pitman 113 to a pin 110. Each pitman 113 is pivotally joined to its bar 100 near the forward pair of guide rollers 101. Fixed on the front (or left) side of the partition 104 is a bearing block 114 carrying a double pulley 115 from which a belt 116 runs to the pulley 108 passing through slots 117 in the partition 104. The pulley 115 is driven by a belt 118 from any desired source of supply.

The mica flakes are fed to the various sifting bins 70, 71, 72, 73 and 74 by any suitable means. For the purpose of illustration there are shown a plurality of hoppers 120 (Figs. 1 and 14), mounted at each side of a platform 121 situated on the upper floor B, and connected to the bins by feed pipes 122, two of which enter each sifting bin through the holes 78 in the top wall thereof hereinbefore referred to. The outlets 123 of these pipes are enlarged or fan-shaped (see Fig. 8) and are preferably provided with baffles 124 to separate the mica flakes flowing through the pipes 122 and deliver them in a plurality of streams into the sifting cradles 80.

Figure 10:
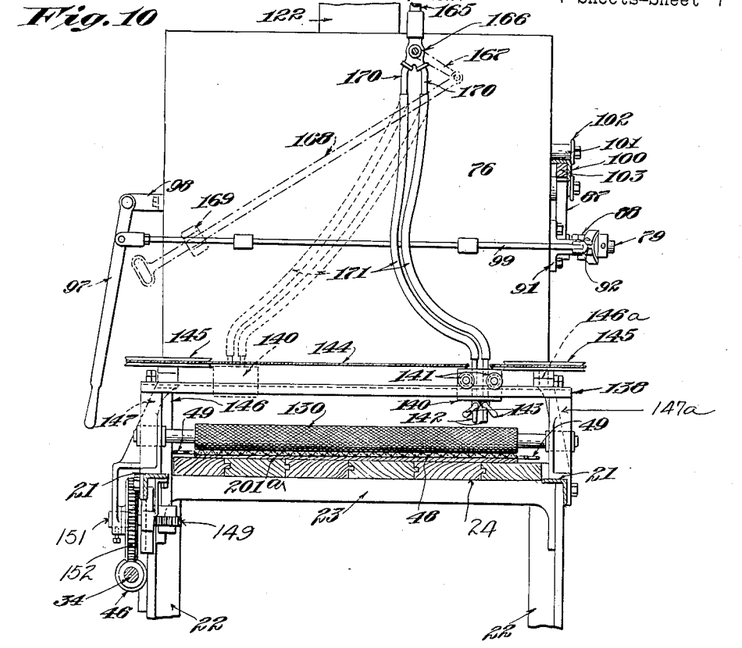
Fig. 10 is a view, in cross-section, taken on the line 10—10 of Fig. 2.

The binder applying device mounted adjacent to each sifting bin comprises a knurled roller 130 which extends transversely of and over the conveyor 48, shown best in Fig. 10. Each of these rollers is the same in construction and operation and only one, therefore, will be described in detail. The roller 130 rotates freely between a pair of supporting brackets 131 carried by the bars 21. In each bracket there is provided a vertical slot 132 (Fig. 2) which receives a block 133 having a central opening into which one end of the roller projects. The roller 130 is yieldingly held against the conveyor 48 by means of plates 134 in the slots 132 bearing upon springs 135 in the slots above the blocks 133. Set screws 136 extend through end cross bars 137 on the brackets 131 and contact with the plates 134 so that by tightening or loosening the screws 136 the pressure of the springs 135 upon the blocks 133 can be regulated as desired. Connecting the end cross bars 137, above the roller 130, are two angle-irons 138 the width of which is such as to leave a transverse slot which extends substantially the entire distance between the brackets 131. The angle-irons 138 thus provide parallel tracks above the roller 130. A block 140 enters the slot and is supported by means of rollers 141 which rest upon the tracks 138. Carried by and projecting downward from the block 140 are a pair of nozzles 142 which terminate a short distance above the roller 130. Each nozzle 142 is provided with a shut-off valve 143 so that either may be used altenately when desired. The block 140 is caused to reciprocate in the slot between the tracks 138 by means of a cable 144 which passes around a pair of grooved pulleys 145 (Fig. 10) supported above each of the end cross bars 137 upon vertical shafts 146 and 146a. The shaft 146a at the right of Fig. 10 is merely a stub while the shaft 146 at the left is longer (see Fig. 11). The ends of the cable 144 are connected to the block 140 so that, obviously, by causing the cable to move on the pulleys 145 the block 140 will travel within the slot and along the tracks 138. The shaft 146 is supported in an upper bracket 147 (Fig. 11) which rests upon a side bar 21 and a lower bracket 148 which is fastened to the lower face of the side bar and depends therefrom. The shaft 146a is supported in a bracket 147a.

Figure 11:
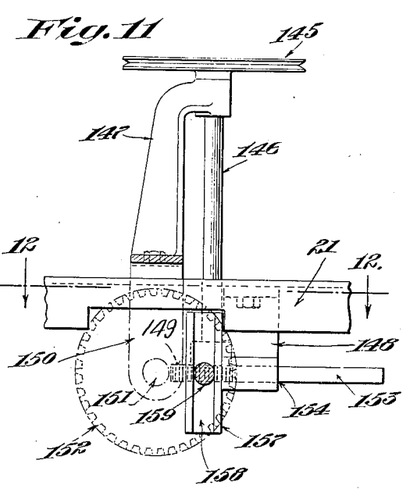
Fig. 11 is a view, in enlarged detail, of a portion of the adhesive applying mechanism.

The cable 144 is actuated from the conveyor driving mechanism in the following manner. To the end of the shaft 146 and below the bracket 148, is secured a pinion 149 (Fig. 12). From the bracket 147 below the side bar 21 to which it is secured extends a projection 150 which supports a cylindrical rod 151, held against rotation therein by a set screw or other suitable means. The rod 151 carries a worm wheel 152 and the end of the rod may be enlarged, to secure the wheel against any longitudinal movement. The worm wheel 152, however, is free to rotate on the rod 151 and is driven by means of a worm 46 on the longitudinal side shaft 34. A rack bar 153, supported in a guide-way 154 in the bracket 148, is provided with teeth 155 meshing with the teeth 156 of the pinion 149. At the forward end of the bar 153, in front of the bracket 148, is secured an arm 157 having a vertical channel 158 therein facing the worm wheel 152. On the inner face of the worm wheel 152 is secured a roller 159 which enters the channel 158 in the arm 157. By the construction just described it will be apparent that rotation of the worm wheel 152 will, by reason of the interengagement of the roller 159 and the arm 157, cause the rack bar 153 to reciprocate. Since the teeth 155 on the bar engage the teeth 156 of the pinion 149 carried by the shaft 146, the result will be that the shaft 146 together with its pulley 145 will be rotated first in one direction and then in the other, and consequently the block 140 will be moved back and forth between the tracks 138 by the cable 144.

Adhesive is supplied to the nozzles 142 from a pair of tanks 160, here shown (Fig. 1) as located upon the upper floor B, having outlet pipes both of which open into a common delivery conduit 162. In each pipe 161 is provided a shut-off valve 163 so that the flow from either tank 160 can be stopped when desired. The conduit 162 leads into an equalizer 164 of any suitable construction which insures the regular flow of the adhesive through pipes 165 to the four adhesive applying devices. Each pipe 165 leads to a three-way valve 166 (Fig. 10) controlled by an arm 167 and a hand bar 168 guided by a loop 169 fixed to the end wall 76 of one of the distributor bins. The several hand bars 168 each terminate at the right side of the machine as indicated on Fig. 1. From each valve 166 there depends a pair of tubes 170 which are connected through the block 140 to the discharge nozzles 142 by lengths of flexible hose 171.

After the conveyer 48 has passed through the partition 104 it leaves the table 24 and travels over an inspection table comprising a coverless box 180 (Figs. 3 and 4) which is carried by the side bars 21 intermediate the forward and rear portions of the table 24. Within the box 180 are distributed a plurality of electric light bulbs 181, the rays from which strike through the conveyor 48 and against the under face of the moist and tacky translucent material carried thereby to indicate to an observer any thick or thin spots that may be present in the sheet of insulating material being formed, which spots, if present, may be rectified to a proper thickness by manually removing the easily separable still moist films from the thick spots or applying additional films to the thin spots. Dirt or foreign matter in the sheet is removed at this inspection. This inspection is made possible by the separation of the fabric belt 63 from the wire mesh conveyor 48 just before the conveyer passes over the inspection table, as has already been described.

The machine has been shown and described as primarily intended to manufacture a sheet of insulating material from mica flakes and its operation will be described with this purpose in mind, although it will be clear that other purposes may be carried out thereby.

The mica has previously been split and graded into two sizes, one comprising flakes or films having dimensions not over two inches in the longest direction and the other comprising flakes having dimensions not over one inch in the longest direction. These flakes are fed through the hoppers 120 and conduits 122 to the cradles 80 in the various distributing or sifting bins 70, 71, 72, 73 and 74, the large size to bins 70 and 74 and the smaller size to bins 71, 72 and 73. The main shaft 27 having been set in motion the conveyor 48 and the other elements to which it is connected are continuously driven during the succeeding operations. The pulley 115 also continuously reciprocates the rack bars 100.

In view of the fact that every sifting bin is separately controlled it is obvious that operations may be begun by distributing mica flakes from the cradles in the first bin 70 and then, as the conveyor 48 travels forward, connecting the cradle segments 87 on the other bins in turn as needed. The mica flakes, in the cradles 80 of the bin 70, sift downward and are distributed in the form of a shower directly upon the conveyer 48 which passes between the side walls 75 and under the end walls 76.

As previously pointed out, the solid table 24 terminates short of the front wall of the sifting bin 70, and in as much as the body of the conveyer is foraminous, it will of course follow that the mica flakes that are too small will fall through the openings in the conveyor, there being no fabric belt 63 beneath the wire mesh at this point (Fig. 2), and be received in the receptacle 56. By this feature it is possible to insure the presence, in the lower or outer layer of the sheet, of flakes having a certain desired dimension and to eliminate therefrom any flakes of a smaller dimension.

The conveyer 48 moves continuously during the entire operation preferably at a speed of about 6 ft. per minute. The degree of angular movement of the cradles 80 is controlled by the location of the wrist pin 110 in the disk 109 (Fig. 13). Obviously the greater the movement the more the flakes will be agitated in the cradles and aerated in the bins. After the conveyer, with the first layer of mica flakes thereon, passes beyond the bin 70 it engages the belt 63 and drags this belt along beneath it over the table 24.

In the meantime the first roller 130 has received a coating of adhesive and bearing down upon the layer, compacts the flakes and at the same time applies a certain amount of adhesive thereto. The table 24 acts to support that portion of the conveyor, and the pressure of the roller is adjusted to compact the layer the desired amount. The amount of adhesive applied can be controlled by means of the valves 143 and 166. The roller 130 is caused to rotate only by its contact with the layer of mica flakes on the conveyor 48. The conveyor with its first layer compacted by the roller 130 now passes through the sifter bin 71 where it receives a second layer of mica flakes which, in turn, is compacted by a second roller 130 and further layers are formed as may be desired up to the number of sifter bins which are provided in the machine. The adhesive upon the final layer from the bin 74 remains upon the upper surface of the flakes ready to bind thereto such additional material as may be added at the inspection station.

After this first stage of the operation has been completed, the material formed on the conveyor 48 passes on, through the partition 104, to the second or inspection stage. As the conveyor leaves the rear portion of the table 24 and the fabric belt 63 is disengaged, it travels over the inspection box 180. The light from the bulbs 181 shines through the conveyor and the material upon it, thus disclosing to the operator any portion of the layer that is not of uniform thickness. When the operator observes any such spot flakes of mica are added or removed by hand to make the resultant plate substantially uniform in thickness.

Under the operation thus described, the material is now in the form of a sheet and it is usually desired to cut the material into plates of a convenient size for handling. This constitutes the third or cutting stage of the operation and takes place on a cutting table 188 (Figs. 1a and 5) located at the forward end of the frame 20 which will presently be described. The sheet is guided from the conveyor onto the table 188 while the conveyor itself passes down into the cleaning tank 57 where it is cleaned and scrubbed by the brushes 58 and then returns rearward.

During the entire operation of the apparatus the conveyor moves continuously and in fact needs no particular attention. At the close of the day's work it is possible for an operator walking along the right side of the machine to operate all the levers 90 and 97, and the bars 168 cutting off the flow of flakes and adhesive, beginning at bin 70, so that the formation of the sheet of material is stopped in proper time relation and there is no waste.

Figure 6:
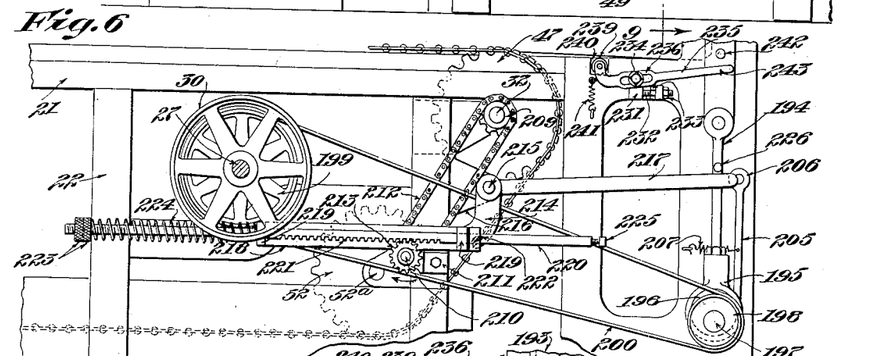
Figs. 6 and 7 are views, in side elevation, illustrating the cutting mechanism in its inoperative and operative positions.

The cutting table 188 may be of any desired form. In the present instance walls of the frame 20 at the sides of the table are provided with spaced extensions 189 (Fig. 5) in which are formed slots 190 to act as guides for a shearing knife 191. The knife has a blade which extends transversely of the edge of the table and is provided with side bars 193 which reciprocate in the slots 190 provided by the extensions 189. To the lower end of the side bars 193 are connected links 194 which terminate in straps 195. The straps embrace eccentrics 196 fixed on a shaft 197 which extend through and is supported by the walls of the table. On one end of the shaft 197 is mounted a pulley 198 (Figs. 6, 7 and 15) driven from a wheel 199 on the main shaft 27 by means of a belt 200. A clutch 201 is provided which, when functioning, will connect the pulley 198 to the shaft 197, thus causing the eccentrics 196 to rotate and transmit motion through the links 194 to the side bars 193 to lower and raise the blade 192. The clutch 201, as shown particularly in Fig. 15, is mounted in the hub 202 of one of the eccentrics 196, the hub being provided with a slot 203 into which projects a finger 204 from the clutch 201. A trip 205 is provided which normally engages the finger 204 and holds the clutch out of engagement with the pulley 198. The trip 205 is pivoted upon a pin 206 (Figs. 6 and 7) and held against the hub 202 by means of a spring 207 and its lower end 208 is beveled as shown in Fig. 15.

Mounted upon the foremost shaft 32 is a sprocket 209 which drives a like sprocket on a stub shaft 210, mounted upon a bracket 211 fixed to the outer face of the foremost post 22, by means of a chain 212. On the shaft 210 is fixed a toothed gear 213 which is thus constantly rotated in the direction of the arrow shown in Fig. 6. A lever 214 is pivotally mounted on a pin 215 fixed on a support 216 from the foremost post 22, and comprises a forward arm 217 and a rearward arm 218. On the arm 218 are provided a pair of spaced guides 219 which support a rack bar 220. The bar 220 is provided with teeth 221 which may rest on and engage the teeth of the gear 213 and as a result of this engagement, it will be obvious from an examination of Fig. 6 that the bar 220 will be moved to the right by the gear 213. A collar 222 on the bar 220 engages the forward guide 219 under certain conditions (see Fig. 6). The rear end of the bar beyond the guide 219 is threaded to receive a pair of nuts 223 between which and the rearward guide 219 is a compressible spring 224 coiled about the bar 220. Obviously, the movement of the bar 220 under the impulse of the gear 213 is resisted by the spring 224. At the outer end of the bar 220 is fixed an adjustable nut 225. On the knife link 194 is a button 226 which projects above the rear end of the arm 217.

From each side wall of the frame 20 adjacent the knife 191 projects a boss 230 which supports a block 231 by means of a bolt 232 and nuts 233. Carried by the block 231 is a pin 234 on which is swung an arm 235 having a slot 236 which receives the pin 234. A nut 237 secures the arm on the pin while permitting a rocking movement thereof. The forward ends 238 of the arms 235 support a freely rotatable roller 239 which extends across the frame below the line of travel of the web. Slots 240 in the walls of the frame receive the ends of the roller 239 and a spring 241 normally holds the roller and arms in lower or the inoperative position shown in Fig. 6. A pin 242 projects from each side bar 193 above the rearward end 243 of the arm 235 in position to engage and depress it in the downward movement of the knife.

The operation of the mechanism just described is as follows: Rotation of the sprocket 213 forces the bar 220 to advance toward the right, meanwhile compressing the coiled spring 224, until the nut 225 strikes the clutch trip 205 and swings it on the pin 206 away from the hub 202 (see Fig. 7). This movement of the trip releases the clutch which, under the action of its spring 227, advances into engagement with the pulley 198, thus causing the shaft 197 to rotate and the eccentrics 196 to draw down the links 194 and the knife 191, cutting off the portion of the composite sheet material that has been advanced by the conveyor 48 beyond the edge of the table 188.

Figure 7:
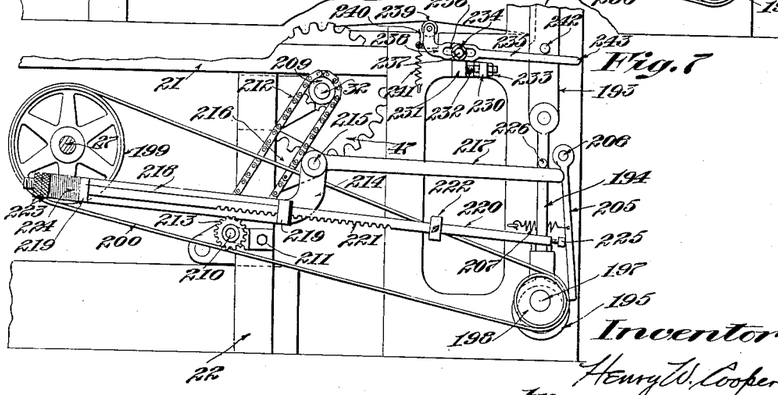

As the links 194 descend the button 226 encounters upon the lever 214 and tilts it on its pin 215, thus raising the bar 220 out of engagement with the gear 213 (see Fig. 7). As soon as this takes place, the compressed coiled spring 224 is released and its expansion retracts the bar 220 until the collar 222 engages the forward guide 219. In the meantime the links 194 have been raised by the eccentrics 196, removing the button 226, and the lever 217 drops into the position shown in Fig. 6, bringing the bar 220 again into engagement with the rotating sprocket 213.

The composite sheet is fed continuously as set forth above and in order to prevent any buckling or breaking of this when its movement is stopped by the knife 191, the roller 239 and its associated parts are provided. While the operation of the bar 220 just described is taking place, the roller 239 is raised from below the sheet (see Fig. 7) by means of the pins 242 which strike the ends 243 of the arms 235. This movement of the roller 239 takes place just as the knife 191 enters the composite sheet and thus raises the sheet, forming a loop in its path of travel so that the forward edge of the sheet does not strike the knife blade 192. As soon as the blade moves above the cutting table, the pins 242 release the arms 235 and the roller drops into its normal position. The roller 239 being freely rotatable does not in any way check the continuous advance of the sheet. The amount of movement of the roller 239 may be set by advancing or retracting the pins 234 in the slots 236 by means of the bolts 232 and nuts 233.

As soon as the bar 220 withdraws from the trip 205 the latter, under the tension of the spring 207, is drawn against the hub 202 so that after the eccentrics have made one complete revolution the finger 204 of the clutch engages the beveled tip 208 of the trip which disengages the clutch 201, leaving the knife blade at the upper end of its stroke and permitting further feeding of the composite sheet beneath it. At the front of the table is secured an inclined plate 228 suitably supported by a brace 229 on which may be placed a wire or other suitable tray, not shown, into which the cut-off plate will fall.

The length of the plate to be cut off is controlled by adjustment of the collar 222 and the nut 225 which fix the elapsed time between the depressions of the knife blade. The position of the collar 222 determines roughly the distance the bar 220 must travel before it strikes the clutch trip 205 and by means of the fine adjustment provided by the nut 225 this can be accurately determined. Since the material is originally made as an unlimited long sheet it must follow that the severed plates can be of any length desired without any such waste, particularly of uneven margins, as would be present if the material were first made up in plates but slightly larger than the desired size.

While one method of operation and one form of apparatus has been shown and described by and upon which this invention may be carried, the invention is not limited thereto since it is obvious that other methods and forms may be devised without departing from the spirit and scope of the invention as set forth in the following claims.

The invention has purposely been set forth in the claims by the use of generic terms and expressions inclusive of various modifications, and in this connection attention is called to my co-pending applications for Method of manufacturing composite sheets, Serial No. 230,892 filed of even date herewith, and for Machine for manufacturing composite sheets, Serial No. 386,052, filed August 15, 1929 as a division of said application Serial No. 230,892, Patents No. 1,829,981 and No. 1,830,522, respectively, of November 3, 1931, which illustrate the mica showering table of the machine of this application having combined therewith mechanism for supplying adhesive binder in one operation to the showered layers of flakes as a substitute for the herein disclosed mechanism for a step-by-step delivery of the binder to the several layers of flakes forming the composite sheet. Those skilled in the art will recognize that it is within the scope of this invention to employ either type of binder supplying mechanism in combination with other features of the machine or in practising the method as herein claimed.

What is claimed as new, is:

1. The method of manufacturing insulating material in sheet form upon a continually moving foraminous conveyer which includes showering the constituent flakes in layers upon said conveyer, compacting each layer by an adhesive coated means while said conveyer continues in motion, and continually passing said sheet and conveyer over a source of light arranged to illuminate concurrently a considerable length of the moving sheet.

2. In an apparatus for manufacturing insulating material, a foraminous conveyer continually moving in one direction, means for showering constituent flakes upon said conveyer in layers, and adhesive coated means compacting each layer.

3. In an apparatus for manufacturing insulating material, a foraminous conveyer continually moving in one direction, means for showering constituent flakes upon said conveyer in layers, adhesive coated means compacting each layer, and a light box over which said conveyer carries said material.

4. In an apparatus for manufacturing insulating material composed of a plurality of superimposed layers of flakes, a plurality of bins, a foraminous conveyer, means for moving said conveyer continuously below all of said bins, means in each of said bins for supplying a layer of flakes upon said conveyer, and a table below all of said bins except the first over which table the upper length of said conveyer travels.

5. In an apparatus for manufacturing insulating material composed of a plurality of superimposed layers of flakes, a plurality of bins, a foraminous conveyer, means for moving said conveyer continuously below said bins, means in each of said bins for supplying a layer of flakes upon said conveyer, a table below certain of said bins, and a cover movable over said table upon which cover the upper length of said conveyer rests as it travels over said table.

6. In an apparatus for manufacturing insulating material composed of a plurality of superimposed layers of flakes, a plurality of bins, a foraminous conveyer, means for moving said conveyer continuously below said bins, means in each of said bins for supplying a layer of flakes upon said conveyer, a table below certain of said bins, and an endless belt covering said table upon which belt the upper length of said conveyer rests moving the belt along said table as the conveyer travels over the table.

7. In an apparatus for manufacturing insulating material composed of a plurality of superimposed layers of flakes, a foraminous conveyer, a plurality of bins from each of which flakes are supplied to said conveyer to form layers thereon, the flake receiving portion of said conveyer below the first of said bins being free whereby the smaller flakes may fall through the holes in said portion.

8. In an apparatus for manufacturing insulating material composed of a plurality of superimposed layers of flakes, a foraminous conveyer, a plurality of bins from each of which flakes are supplied to said conveyer to form layers thereon, the flake receiving portion of said conveyer below one of said bins being free whereby the smaller flakes may fall through the holes in said portion, and a table supporting those portions of said conveyer below other bins.

9. In an apparatus for manufacturing insulating material composed of a plurality of superimposed layers of flakes, means for compacting a layer and applying adhesive thereto comprising a roller, a track extending longitudinally over said roller, and means carried by said track for supplying adhesive to said roller, said means being reciprocable over said roller.

10. In an apparatus for manufacturing insulating material composed of a plurality of superimposed layers of flakes, means for compacting a layer and applying adhesive thereto comprising a roller, a track extending longitudinally over said roller, an adhesive outlet carried by said track for supplying adhesive to said roller, and means for reciprocating said outlet over said roller.

11. In an apparatus for manufacturing insulating material, a foraminous conveyer, means for assembling and compressing thereon the constituent flakes of a composite sheet, means for applying adhesive binder to the surface of the sheet on the conveyor, and a source of light over which the sheet is conducted by the conveyor, whereby thin places may be detected and compensating flakes supplied, being secured by the adhesive.

12. Apparatus for manufacturing an unlimited long sheet of stratified mica films comprising a foraminous conveyer continually moving in one direction, means above one portion of the run of the conveyer for showering mica films upon said conveyer, adhesive applying means, and means below another portion of the run of said conveyer for illuminating substantially the entire under side of the translucent sheet of moist films being advanced by the conveyer.

13. Apparatus for manufacturing an unlimited long sheet of stratified mica films comprising a foraminous conveyer continually moving in one direction, means above one portion of the run of the conveyer for successively showering layers of mica films upon the conveyer to build a sheet of the desired thickness, means for causing the several layers and the films thereof to adhere together, and a source of light of substantially constant intensity below a portion of the run of the conveyer in advance of said showering means to illuminate the moist traveling sheet through the openings in said conveyer.

14. Apparatus for manufacturing an unlimited long sheet of stratified mica films comprising a foraminous conveyer continually moving in one direction, means above one portion of the run of the conveyer for successively showering layers of mica films upon the conveyer to build a sheet of the desired thickness, means for permeating the films comprising the several layers with a binder and for compacting the layers to form a coherent sheet, and stationary means below another portion of the run of the conveyer for illuminating the moist traveling sheet through the conveyer.

15. In an apparatus for manufacturing stratified mica plate, a foraminous conveyer continually moving in one direction, means under which said conveyer travels for showering mica films upon said conveyer in layers, film binding means, and an uncovered light box over which said conveyer carries the sheet of films.

16. In an apparatus for manufacturing stratified mica plate, a foraminous conveyer continually moving in one direction, means under which said conveyer travels for showering mica films upon said conveyer in layers, means for applying a binder to said films and for pressing the sheet to effect adherence of its several layers, and means for constantly illuminating the moving sheet through said foraminous conveyer.

17. The method of manufacturing an unlimited long sheet of stratified mica films having a substantially uniform thickness which consists in continuously producing a sheet of adhesively bound films, said sheet having areas varying in thickness, continuously moving said sheet across a source of light, and then thinning the thick areas and thickening the thin areas revealed by virtue of said light while said sheet is still moist and continues in motion across said source of light.

18. The method of rectifying the thickness of manufactured mica plate produced in an unlimited long sheet by a showering and binding of the mica films which consists in continually advancing the sheet, detecting the thick and the thin areas while the sheet is in motion, and thereupon removing films from a detected thick area and replacing them on a detected thin area.

19. The method of rectifying the thickness of a moving, unlimited long sheet composed of bound stratified mica films which consists in revealing the areas varying from a standard thickness to an operator past whom the sheet travels, and adding mica films to or removing them from said areas while passing through the field of operation of said operator.

20. The method of manufacturing mica plate which consists in showering mica films in layers upon a continually moving conveyer, applying an adhesive binder and compacting said layers to a composite sheet during the continued forward movement of the conveyer, maintaining the moving sheet for a considerable length of time above a source of light, and rectifying the thickness of said sheet while thus illuminated.

21. Apparatus for manufacturing composite mica plate comprising a flexible wire-mesh conveyer, means for assembling thereon successive layers of mica flakes for building an unlimited long stratified sheet, means for supplying adhesive binder to cause adherence of the flakes thus assembled, a light box over which the sheet formed by the cohered flakes is conducted by the conveyer to enable immediate detection and rectification of variations in thickness, and means for uninterruptedly advancing said conveyer and sheet.

22. Apparatus for manufacturing composite mica plate comprising, an endless wire-mesh conveyer, devices along the run of said conveyer in the sequence named, for showering mica flakes thereon, for supplying adhesive to bind said flakes together and for rendering the rectified sheet formed by the cohered flakes transparent to facilitate rectification of its thickness, means for continually moving said conveyer and sheet past said devices, and means for severing the sheet into plates of the desired size.

23. Apparatus for manufacturing composite mica plate comprising a long supporting frame, a wire-mesh conveyer on said frame, means for continually advancing said conveyer devices above one portion of said frame for showering mica flakes in successive layers on said conveyer, means for binding said layers into a coherent sheet, and a source of light below another portion of the frame, said frame being covered to provide a table below said showering means but being uncovered above said source of light to permit illumination of said continually advancing sheet through the meshes of its conveyer.

HENRY W. COOPER.

CERTIFICATE OF CORRECTION.

Patent No. 1,925,137.  September 5, 1933.

HENRY W. COOPER.

It is hereby certified that error appears in the printed specification of the above numbered patent requiring correction as follows: Page 7, line 129, claim 22, strike out the word "rectified" and insert the same before the word "sheet" in line 133; and line 138, claim 23, after "conveyer" insert a comma; and that the said Letters Patent should be read with these corrections therein that the same may conform to the record of the case in the Patent Office.

Signed and sealed this 24th day of October, A. D. 1933.

(Seal)

F. M. Hopkins
Acting Commissioner of Patents.